United States Patent Office 3,433,791
Patented Mar. 18, 1969

3,433,791
ENDOETHANO NOR ORIPAVINES AND NOR THEBAINES
Kenneth Walter Bentley, Willerby, Hull, England, assignor to Reckitt & Sons Limited, Hull, Yorkshire, England
No Drawing. Continuation-in-part of application Ser. No. 478,738, Aug. 10, 1965. This application May 3, 1968, Ser. No. 726,591
Claims priority, application Great Britain, June 15, 1965, 25,289/65
U.S. Cl. 260—285
Int. Cl. C07d 43/28; A61k 25/00
8 Claims

ABSTRACT OF THE DISCLOSURE

Thebaine and oripavine derivatives of the formula:

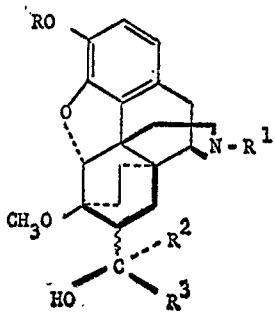

wherein
R is hydrogen or methyl,
$R^1$ is hydrogen, alkyl, alkenyl or alkynyl of up to 8 carbon atoms or cycloalkyl methyl of 4–6 carbon atoms,
$R^2$ is hydrogen, alkyl or alkenyl of up to 3 carbon atoms, phenyl or tolyl, and
$R^3$ is cycloalkyl of 5–7 carbon atoms, alkyl or alkenyl of up to 8 carbon atoms or alkyl or alkenyl of up to 8 carbon atoms substituted on one of the carbon atoms numbered 1–4 (the carbon atom numbered 1 being adjacent to the carbon atom bearing the alcoholic hydroxy group) by cycloalkyl of 5–7 carbon atoms, phenyl, tolyl, alkoxy of 1–3 carbon atoms, phenoxy or tetrahydrofuryl, provided that in the case where R is hydrogen, $R^2$ and $R^3$ do not contain the system —ĊH-phenyl, —ĊH-tolyl or

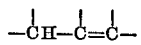

attached directly to the carbon atom bearing the alcoholic hydroxy group, and non-toxic pharmaceutically acceptable salts thereof, are useful as analgesics.

---

This application is a continuation-in-part of my copending application Ser. No. 478,738 filed Aug. 10, 1965.

The present invention is concerned with thebaine and oripavine derivatives and their non-toxic pharmaceutically acceptable salts.

More particularly, the thebaine and oripavine derivatives of the present invention may be represented by the formula:

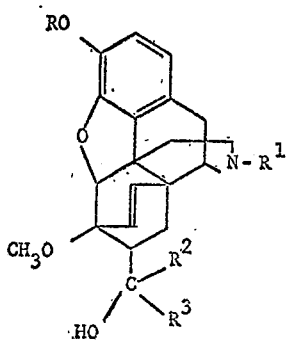

which compounds have a steric configuration according to Compound I:

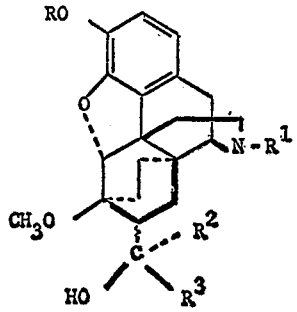

(I)

wherein
R is hydrogen or methyl,
$R^1$ is hydrogen, alkyl, alkenyl or alkynyl of up to 8 carbon atoms or cycloalkyl methyl of 4–6 carbon atoms,
$R^2$ is hydrogen, alkyl or alkenyl of up to 3 carbon atoms, phenyl or tolyl, and
$R^3$ is cycloalkyl of 5–7 carbon atoms, alkyl or alkenyl of up to 8 carbon atoms or alkyl or alkenyl of up to 8 carbon atoms substituted on one of the carbon atoms numbered 1–4 (the carbon atom numbered 1 being adjacent to the carbon atom bearing the alcoholic hydroxy group) by cycloalkyl of 5–7 carbon atoms, phenyl, tolyl, alkoxy of 1–3 carbon atoms, phenoxy or tetrahydrofuryl, provided that in the case where R is hydrogen, $R^2$ and $R^3$ do not contain the system —ĊH-phenyl —ĊH-tolyl or

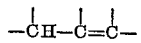

attached directly to the carbon atom bearing the alcoholic hydroxy group, and non-toxic pharmaceutically acceptable salts thereof.

The compounds according to the invention can be prepared by the catalytic hydrogenation of compounds of the formula:

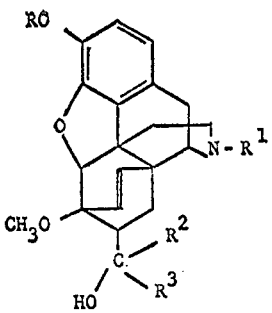

which compounds have a steric configuration according to Compound II:

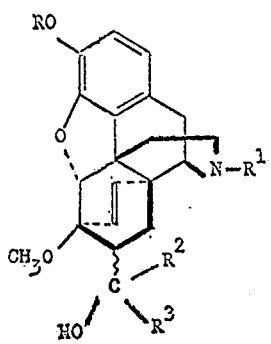

(II)

wherein R, $R^2$ and $R^3$ have the meanings given above. The compounds of Formula II are described in British Patents Nos. 925,723, 937,214 and 969,263. Preferably the catalyst used is Raney nickel and the reaction is carried out at elevated temperature and pressure. The reaction conditions generally lie in the temperature range of from 100° C. to 200° C., the preferred range being from about 140° C. to 180° C. and the pressure range of up to 200 atmospheres, the preferred range being from 140–200 atmospheres. Clearly this method cannot be applied to compounds in which R, $R^1$, $R^2$ and $R^3$ are affected by these reduction conditions.

The compounds according to the invention can also be obtained by hydrogenation of the compound:

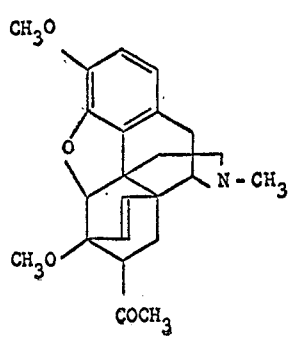

which compounds have a steric configuration according to compound III:

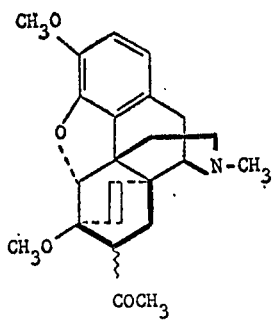

(III)

at room temperature and pressure in the presence of a palladium catalyst. The compound of Formula III may be prepared by the direct reaction of thebaine with 3-buten-2-one. Under these conditions, the 6,14-endoetheno chain is converted into an endoethano chain, while the 7-acetyl group is not effected.

The resulting compound:

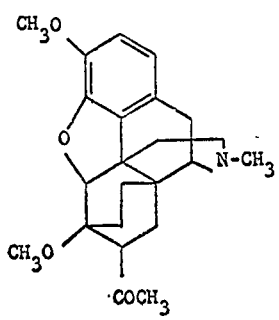

which compound has a steric configuration according to compound IV:

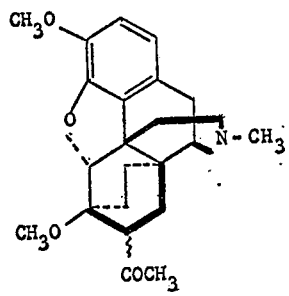

(IV)

can then be converted into a compound of Formula I by reaction with a Grignard reagent $R^2MgX$, where X represents a halogen atom or an organolithium compound $R^2Li$, or alternatively with a Grignard reagent $R^3MgX$ or an organolithium compound $R^3Li$ to give a compound of Formula I in which either $R^3$ is methyl or $R^2$ is methyl respectively.

Similar compounds of Formula I may be prepared in an analogous manner by the reaction of an ethano ketone having a different acyl group at position 7 (e.g. propionyl) with a Grignard reagent or an organolithium compound. These ketones may be prepared in a manner similar to the preparation of 6,14-endoethano-7-acetyl tetrahydrothebaine.

The compounds of Formula I in which R=H may be prepared from the corresponding bases in which R is methyl by heating with an alkali metal hydroxide or alkoxide in a suitable solvent such as diethylene glycol at a temperature above 180° C., preferably about 200–210° C. However it will be understood that compounds containing the systems —C(OH)—CH-aryl and

—C(OH)—CH—C=C— do not survive such vigorous reaction conditions as they suffer base-catalyzed dehydration in the process.

Compounds of the formula (I) in which R is acyl of the formula $C_nH_{2n+1}CO$—, in which $n$ represents an integer from 1 to 3, such as acetyl, propionyl or butyryl, or benzoyl or nicotinoyl can also be prepared according to the present invention from compounds of the same formula, wherein R is a hydrogen atom, by any of the standard methods for the esterification of a phenolic hydroxyl group.

The compounds of Formula I in which $R^1$ is hydrogen may be prepared from the corresponding compound in which $R^1$ is methyl by treatment with cyanogen bromide to give a compound in which $R^1$ in cyano (CN), and this intermediate N-cyano compound is heated in alkaline medium to remove the cyano group and replace it by hydrogen. The method of production of this secondary base depends on the value of R required in the final product. If R is to be methyl then the secondary base may be produced by treating the N-cyano compound with an alkali metal hydroxide or alkoxide in a suitable solvent, such as diethylene glycol at 170° C., if R is to be hydrogen the temperature must be of the order of 210° C.

The resulting northebaine and nororipavine compounds of Formula I wherein $R^1$ represents a hydrogen atom can be converted into a compound of Formula I, in which $R^1$ is other than hydrogen either by alkylation with an alkyl alkenyl or alkynyl halide of the formula $R^1$-Hal, in which Hal represents a halogen atom, or acylation followed by reduction of the resulting amide with lithium aluminum hydride.

Compounds of Formula I in which $R^1$ is other than a hydrogen atom or a methyl group can also be obtained from the reaction of a compound of Formula I in which $R^1$ is methyl with equimolar concentrations of methyl or ethyl azodicarboxylate, to give a methylene-bis-compound of the formula (VI)

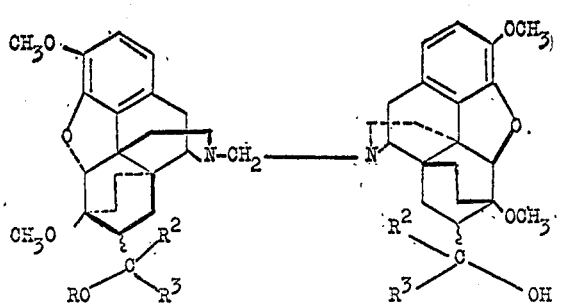

which is converted directly into a compound of Formula I by treatment with an alkali halide of the formula $R^1$-Hal wherein Hal represents a halogen atom and $R^1$ represents alkyl of 2 to 8 carbon atoms or alkenyl of 2 to 8 carbon atoms, alkynyl of 3 to 8 carbon atoms; or by acylation with a cycloalkyl carbonyl chloride containing 4 to 6 carbon atoms, followed by reduction with lithium aluminium hydride.

It will be understood that reactions similar to those set out above for the conversion of $R^1$ may also be carried out on the 7-acyl substituted compounds, such as those of Formula III or Formula IV. The compounds so obtained may then be treated in the manner hereinbefore described to give compounds of Formula I.

The pharmaceutically acceptable salts of the bases of Formula I may be obtained by the treatment of these bases with a pharmaceutically acceptable acid.

The following examples illustrate the preparation of thebaine and oripavine derivatives in accordance with the invention:

EXAMPLE 1

6,14-endoethano-7-(2-hydroxy-2-propyl) tetrahydrothebaine 6,14 - endoetheno-7-(2-hydroxy-2-propyl) tetrahydrothebaine (40 g.) in ethanol (300 ml.) was hydrogenated in the presence of Raney nickel catalyst (10 g.) at 161–164° C. and 164–182 ats. for 4 hours. Concentration of the solution after removal of the catalyst by filtration afforded a white crystalline solid (26 g.). This material was recrystallized from ethanol, M.P. 142° C. (Found: C, 71.7; H, 8.2; N, 3.5%. $C_{24}H_{33}NO_4$ requires C, 72.2; H, 8.3; N, 3.5%.)

EXAMPLE 2

6,14-endoethano-7-(2-hydroxy-2-butyl) tetrahydrothebaine 6,14 - endoetheno - 7 - (2-hydroxy-2-butyl)tetrahydrothebaine (10 g.) in ethanol (300 ml.) was hydrogenated in the presence of Raney nickel catalyst (4 g.) at 150–155° C. and 182–188 ats. for 4½ hours. Concentration of the solution after removal of the catalyst by filtration afforded a white crystalline solid (9 g.). This material was recrystallized from ethanol, M.P. 145.5° C. (Found: C, 72.7; H, 8.3; N, 3.4%. $C_{25}H_{35}NO_4$ requires C, 72.7; H, 8.5; N, 3.4%.)

EXAMPLE 3

6,14-endoethano-7-(2-hydroxy-2-pentyl) tetrahydrothebaine 6,14 - endoetheno - 7 - (2-hydroxy-2-pentyl)tetrahydrothebaine (20 g.) in ethanol (300 ml.) was hydrogenated in the presence of Raney nickel catalyst (5 g.) at 140–142° C. and 160–168 ats. for 6 hours. Concentration of the solution after removal of the catalyst by filtration afforded a white crystalline solid (8 g.). This material was recrystallized from ethanol, M.P. 185–187° C.

EXAMPLE 4

6,14-endoethano-7-(2-hydroxy-4-methyl-2-pentyl) tetrahydrothebaine 6,14 - endoetheno - 7 - (2-hydroxy-4-methyl-2-pentyl) tetrahydrothebaine (20 g.) in ethanol (300 ml.) was hydrogenated in the presence of Raney nickel catalyst (5 g.) at 150° C. and 150 ats. for 6 hours. Concentration of the solution after removal of the catalyst by filtration afforded a white crystalline solid (12 g.) This material was recrystallized from ethanol, M.P. 170° C.

EXAMPLE 5

6,14-endoethano-7-(2-hydroxy-5-methyl-2-hexyl) tetrahydrothebaine 6,14 - endoetheno - 7 - (2-hydroxy-5-methyl-2-hexyl) tetrahydrothebaine (20 g.) in ethanol (300 ml.) was hydrogenated in the presence of Raney nickel catalyst (4 g.) at 170–174° C. and 193–196 ats. for 3 hours. The product was worked up as in Example 1, M.P. 125–126° C.

EXAMPLE 6

6,14-endoethano-7-(2-hydroxy-2-heptyl)tetrahydrothebaine 6,14-endoetheno-7-(2-hydroxy-2-heptyl) tetrahydrothebaine (16 g.) in ethanol (200 ml.) was hydrogenated in the presence of Raney nickel catalyst (5 g.) at 170–175° C. and 188–192 ats. for 3 hours. Concentration of the solution after removal of the catalyst by filtration afforded a glue. This glue was dissolved in petroleum (B.P. 30 to 40° C.) and this solution after standing, yielded a white solid which was recrystallized from ethanol, M.P. 110–12° C.

EXAMPLE 7

6,14-endoethano-7-(2-hydroxy-1-cyclohexyl-2-propyl) tetrahydrothebaine 6,14 - endoetheno - 7 - (2-hydroxy-1-phenyl-2-propyl) tetrahydrothebaine (18 g.) in ethanol (300 ml.) was hydrogenated in the presence of Raney nickel catalyst (4 g.) at 157° C. and 178 ats. for 8 hours. After removal of the catalyst a solid (2.5 g.) separated from the cooled solution, M.P. 160–162° C. (Found: C, 74.8; H, 8.9; N, 3.0% $C_{30}H_{43}NO_4$ requires C, 74.9; H, 9.0; N, 2.9%.)

EXAMPLE 8

7-acetyl-6,14-endoethanotetrahydrothebaine 7-acetyl-6,14-endoethenotetrahydrothebaine (5 g.) in ethanol (200 ml.) was hydrogenated over 10% palladium on charcoal (0.5 g.) at a hydrogen pressure of 58 lb./in.$^2$ and 50° C. for 10 hours. Filtration, evaporation of the filtrate, and crystallization of the residue from ethanol gave the endoethano compound (3.5 g.), M.P. 133–136° C.

EXAMPLE 9

6,14-endoethano-7-(2-hydroxy-2-propyl)-tetrahydrothebaine

The ketone from Example 8 (4.8 g.) in ether (220 ml.) was added to a boiling agitated solution of the Grignard reagent from magnesium (0.83 g.) and methyl iodide (5.2 g.) in ether (20 ml.). The mixture was boiled and stirred for 1 hour and the product suspension was added to cold concentrated ammonium chloride solution. The ether layer was separated and the aqueous material was extracted with ether. The combined ether extracts after drying over anhydrous sodium sulphate gave an oil which crystallized on cooling. Crystallization from ethanol gave the product (3.1 g.) of M.P. 142° C. This material is identical to that obtained by hydrogenation of 6,14-endoetheno-7-(2-hydroxy-2-propyl)-tetrahydrothebaine.

EXAMPLE 10

6,14-endoethano-7-(2-hydroxy-2-hexyl)tetrahydrothebaine 6,14-endoetheno-7-(2-hydroxy-2 - hexyl)tetrahydrothebaine (30 g.) in ethanol (400 ml.) was hydrogenated in the presence of Raney nickel catalyst (8 g.) at 160–165° C. and 173–182 ats. for 4 hours. The product was worked up as in Example 1 and after recrystallization from ethanol, the product (8.0 g.) had M.P. 146–147° C. (Found: C, 73.5; H, 8.9; N, 3.0% $C_{27}H_{39}NO_4$ requires C, 73.5; H, 8.9; N, 3.2%.)

EXAMPLE 11

6,14-endoethano-7-hydroxymethyltetrahydrothebaine 6,14-endoetheno - 7-hydroxymethyltetrahydrothebaine (9.25 g.) in ethanol (40 ml.) was hydrogenated at atmospheric pressure and temperature in the presence of palladium on charcoal catalyst (10%, 200 mg.). The mixture was filtered, the filtrate evaporated to dryness and the product crystallized from diethyl ether to give 5.7 g. with M.P. 122–124° C. (Found: C, 71.0; H, 8.0% $C_{22}H_{29}NO_4$ requires C, 71.1; H, 7.9%.)

EXAMPLE 12

6,14-endoethano-7-(2-hydroxy-2-butyl)tetrahydrothebaine 7-acetyl-6,14 - endoethanotetrahydrothebaine (100 g. 0.26 mol) in ether (2.5 l.) was added to a boiling stirred solution of ethyl magnesium iodide prepared from magnesium (19 g., 0.79 mol) and ethyl iodide (122 g., 0.78 mol) in ether (100 ml.). The mixture was then stirred and heated under reflux for 1½ hours. The mixture was added to a saturated aqueous solution of ammonium chloride (5 l.), the ether layer separated and the aqueous layer further extracted twice with ether. The combined ether extracts were dried and evaporated. The product was crystallized from aqueous methanol and recrystallized from ethanol. The product (40.6 g.) had M.P. 145.5° C. The product was identical to that obtained in Example 2.

EXAMPLE 13

6,14-endoethano-7-(2-hydroxy-3,3-dimethyl-2-butyl) tetrahydrothebaine

A solution of tertbutyl magnesium chloride was prepared from magnesium (38.1 g.) in ether (300 ml.) and 2-chloro-2-methylpropane (tert-butyl chloride) (145 g.) in ether (200 ml.) and benzene (200 ml.). The mixture was stirred overnight and titration of a sample indicated a 67% conversion to the Grignard reagent. 7-acetyl-6,14-endoethanotetrahydrothebaine (100 g.) in benzene (500 ml.) was added over 1 hour to the stirred mixture. After standing overnight, the mixture was added to a saturated aqueous solution of ammonium chloride (5 l.), the organic layer was separated, the aqueous layer was further extracted from methanol to give 28.4 g. A sample further recrystallized from methanol had M.P. 188° C. (Found: C, 73.2; H, 9.0; N, 2.9% $C_{27}H_{39}NO_4$ requires C, 73.4; H, 8.9; N, 3.2%.)

EXAMPLE 14

6,14-endoethano-7-(2-hydroxy-3-methyl-2-butyl) tetrahydrothebaine

A solution of isopropyl magnesium chloride was prepared from magnesium (48.6 g.) in ether (300 ml.) and 2-chloropropane (157 g.) in ether (200 ml.) and benzene (200 ml.). The mixture was stirred overnight and after titration had indicated a 73% conversion to the Grignard reagent, 7-acetyl-6,14-endoethano-tetrahydrothebaine (140 g.) in benzene (800 ml.) was added over 1 hour to the stirred mixture. After stirring for 5 hours the mixture was allowed to stand overnight. The mixture was added to a saturated aqueous solution of ammonium chloride (5 l.), the organic layer was separated, the aqueous layer was further extracted with ether and the combined organic layer was evaporated. The resulting gum was crystallized from methanol and the crop of crystals (phenolic) was rejected. The liquor was evaporated and the residue repeatedly recrystallized from a mixture of 2 N aqueous sodium hydroxide (100 ml.) and ethanol (200 ml.) to give the product (38 g.), M.P. 157–158° C. (Found: C, 73.4; H, 8.7; N, 3.1%. $C_{26}H_{37}NO_4$ requires C, 73.1; H, 8.7; N, 3.3%.)

EXAMPLE 15

6,14-endoethano-7-(2-hydroxy buten-2-yl)tetrahydrothebaine

A solution of vinyl magnesium bromide was prepared from magnesium (2.54 g.) in tetrahydrofuran (50 ml.)

and vinyl bromide (11.2 g.) in tetrahydrofuran (50 ml.). The mixture was stirred for 18 hours and then 7-acetyl-6, 14-endoethanotetrahydrothebaine (10 g.) in tetrahydrofuran (100 ml.) was added with stirring. After standing overnight the mixture was added to a saturated aqueous solution of ammonium chloride (500 ml.) with stirring. The organic layer was separated and the aqueous layer was extracted with ether (2× 200 ml.). The combined organic layers were extracted with water (3× 300 ml.) and the ethereal solution was dried and evaporated. The resulting oil was crystallized from aqueous methanol to give the product (4.8 g.), M.P. 129° C.

EXAMPLE 16

6,14 - endoethano - 7-(2-hydroxy-3-methyl-2-pentyl)tetrahydrothebaine and 6,14-endoethano-7-(1-hydroxyethyl) tetrahydrothebaine A solution of sec-butyl magnesium chloride was prepared from magnesium (48.6 g.) in ether (300 ml.) and 2-chlorobutane (185 g.) in ether (200 ml.) and benzene (200 ml.). After stirring overnight, 7-acetyl-6,14-endoethanotetrahydrothebaine (140 g.) in benzene (800 ml.) was added over 1 hour to the stirred mixture. After stirring for 5 hours the mixture was allowed to stand overnight. The mixture was added to a saturated aqueous solution of ammonium chloride and after extraction and evaporation of the organic extracts the gum was crystallized twice from a mixture of 2 N sodium hydroxide solution (200 ml.) and ethanol (200 ml.) and then recrystallized from methanol to give crystalline 6,14-endoethano - 7 - (2 - hydroxy - 3 - methyl-2-pentyl)tetrahydrothebaine (16.2 g.), M.P. 162–164° C. (Found: C, 74.1; H, 8.8; N, 3.1%. $C_{27}H_{39}NO_4$ requires C, 73.4; H, 8.9; N, 3.2%.) Water was added to the methanolic mother liquor and the crystalline product (42 g.) collected, recrystallized from aqueous isopropanol and purified by repeated chromatography on an alumina column in diisopropyl ether. The product was then recrystallized from aqueous methanol to give 6,14-endoethano-7-(1-hydroxyethyl)tetrahydrothebaine (2.4 g.), M.P. 64–66° C. (Found: C, 71.3; H, 8.0; N, 3.8%. $C_{23}H_{31}NO_4$ requires C, 71.6; H, 8.1; N, 3.6%.)

EXAMPLE 17

N-cyano-6,14-endoethano-7-(2-hydroxy-2-propyl) tetrahydronorthebaine 6,14 - endoethano - 7 - (2 - hydroxy - 2 - propyl)tetrahydrothebaine (46 g.) and cyanogen bromide (13.5 g.) were dissolved in methylene chloride (80 ml.) and allowed to stand overnight. The solution was evaporated and the product was recrystallized from ethanol (38.2 g.), M.P. 2–5° C. (Found: C, 69.6; H, 7.0; N, 6.9%. $C_{24}H_{30}N_2O_4$ requires C, 70.2; H, 7.4; N, 6.8%.)

EXAMPLE 18

6,14-endoethano-7-(1-hydroxy-1-cyclohexyl-1-ethyl) tetrahydronorthebaine

N - cyano - 6,14-endoethano-7-(1-hydroxy-1-cyclohexyl-1-ethyl)tetrahydronorthebaine (36.2 g.) was added to a stirred solution of potassium hydroxide (36.2 g.) in diethylene glycol (440 ml.), at 170° C. under nitrogen. The mixture was stirred for 1¼ hours at 170° C. The mixture was poured on to ice-water (3 l.), the precipitate was collected, crystallized from methanol and recrystallized from ethanol (27.9 g.). A sample recrystallized from ethanol had M.P. 174° C. (Found: C, 74.3; H, 8.5; N, 3.2%. $C_{28}H_{39}NO_4$ requires C, 74.1; H, 8.7; N, 3.1%.)

EXAMPLE 19

7-acetyl-6,14-endoethanotetrahydronorthebaine hydrochloride (a) N - cyano - 7-acetyl-6,14-endoethanotetrahydronorthebaine was prepared by the method of Example 17 in 89% yield, M.P. 195–199° C. (Found: C, 69.9; H, 7.0; N, 7.0%. $C_{23}H_{26}N_2O_4$ requires C, 70.0; H, 6.6; N, 7.1%.)

The solution of the N-cyano compound (10 g.) in acetic acid (100 ml.) was stirred for a few minutes with charcoal and filtered. The filtrate was hydrogenated in the presence of palladium on charcoal (10%, 0.5 g.) at room temperature and 50 lbs./sq. in. for 1 hour. Concentration of the solution after removal of the catalyst afforded a glue which was dissolved in warm water (150 ml.). The solution was made alkaline with aqueous sodium hydroxide to pH 8.5. Ethanol was added to obtain a clear solution and the solution was heated on the water bath for 2 hours. The precipitate (8.1 g.) was collected. A sample crystallized from isopropanol gave N-formyl-7-acetyl-6,14-endoethanotetrahydronorthebaine, M.P. 217–218° C. (Found: C, 68.9; H, 7.1%. $C_{23}H_{27}NO_5$ requires C, 69.5; H, 6.9%.)

The N-formyl compound (4.5 g.) in isopropanol (20 ml.) was refluxed with stirring for 17 hours with ethanol saturated with hydrogen chloride (9 ml.). After cooling the mixture was filtered to give 7-acetyl-6,14-endoethanotetrahydronorthebaine hydrochloride (3.6 g.). A sample was recrystallized from n-butanol, M.P. >300° C. (Found: C, 64.9; H, 7.2; N, 3.3%. $C_{22}H_{27}NO_4HCl$ requires C, 65.1; H, 7.0; N, 3.5%.)

(b) Dimethyl azodicarboxylate (1.9 g.) was added to a solution of 7-acetyl-6,14-endoethanotetrahydrothebaine (5.0 g.) in the minimum amount of hot acetone. The solvent was evaporated on a steam bath and the residue was heated for ½-hr. The gum was dissolved in 2 N hydrochloric acid (14 ml.) and water (6 ml.) and allowed to stand for 4 hours. The solution was made alkaline and the solid was collected and recrystallized from aqueous methanol. The base was converted to the hydrochloride and recrystallized from n-butanol (1.2 g.), identical with the material obtained in (a).

EXAMPLE 20

N-propyl-6,14-endoethano-7-(2-hydroxy-2-propyl) tetrahydronorthebaine (a) 6,14-endoethano-7-(2-hydroxy - 2 - propyl)tetrahydronorthebaine (6.0 g.), propyl iodide (9.0 g.) and anhydrous potassium carbonate (15 g.) in acetone were stirred under reflux for 20 hours. The hot mixture was filtered, the filtrate was concentrated and water was added. The solid was collected and recrystallized from aqueous acetone (5.4 g.), M.P. 136–138° C. (Found: C, 72.6; H, 8.8; N, 3.4% $C_{26}H_{37}NO_4$ requires C, 73.0; H, 8.7; N, 3.3%.)

(b) 7-acetyl - 6,14 - endoethanotetrahydronorthebaine hydrochloride (5.5 g.) was dissolved in water, the solution was made alkaline and extracted with benzene, the extract being dried and evaporated. The gum was dissolved in acetone (44 ml.) and stirred under reflux for 17 hours with propyl iodide (9.25 g.) and anhydrous potassium carbonate (15 g.). The hot solution was filtered, the residue washed with acetone and the combined liquors evaporated to dryness. The residue was extracted with chloroform, the extract was evaporated and the gum (5.5 g.) was crystallised from ethanol to give N-propyl-7-acetyl - 6,14 - endoethanotetrahydronorthebaine (3.1 g.), M.P. 94–97° C. The product was further recrystallized and had M.P. 98–100° C. (Found: C, 73.0; H, 7.7% $C_{15}H_{33}NO_4$ requires C, 73.0; H, 8.1%.)

N-propyl - 6,14 - endoethano-7-(2-hydroxy-2-propyl) tetrahydronorthebaine was obtained from N-propyl-7-acetyl-6,14-endoethanotetrahydronorthebaine (3.0 g.) and methyl-iodide by the general method of Example 9. Crystallization of the crude product from methanol gave (1.73 g.) M.P. 136–138° C., identical (IR spectrum, mixed M.P.) with the material prepared in (a).

EXAMPLE 21

N-cyclopropylmethyl-6,14-endoethano-7-(2-hydroxy-2-butyl)tetrahydronorthebaine

11

Cyclopropyl carbonyl chloride (11.3 g.) was cautiously added to a solution of 6,14-endoethano-7-(2-hydroxy-2-butyl)tetrahydronorthebaine (14.5 g.) in dichloromethane (75 ml.) and triethylamine (11.0 g.). After two days the mixture was washed with water (3×100 ml.) and the organic layer was dried and evaporated. The residue in dry tetrahydrofuran (250 ml.) was added to a stirred suspension of lithium aluminium hydride (3.0 g.) in dry tetrahydrofuran (250 ml.) and boiled under reflux for 4 hours. A cold saturated solution of sodium potassium tartrate was then added. The aqueous layer was extracted with ether (3×100 ml.) and the ethereal extracts were combined with the original organic layer and washed with water three times. The solution was dried and evaporated and the glassy material crystallized from methanol to give 9.7 g. A sample further recrystallized had M.P. 99–100° C. (Found: C, 74.3; H, 8.7; N, 2.7% $C_{28}H_{39}NO_4$ requires C, 74.1; H, 8.7; N, 3.1%.)

EXAMPLE 22

N-cyclopropylmethyl-6,14-endoethano-7-hydroxymethyl-tetrahydronorthebaine

Cyclopropyl carbonyl chloride (2.8 g.) was added to 6,14-enoethano-7-ethoxycarbonyl - tetrahydronorthebaine (5.3 g.) in triethylamine (2.6 g.) and dichloromethane (40 ml.). After standing at room temperature for two days, the mixture was washed with water and the organic layer was dried, and evaporated. The residue was crystallized from methanol to give N-cyclo-propylcarbonyl-6,14-endoethano-7-ethoxycarbonyl tetrahydronorthebaine (5.2 g.), M.P. 202° C. (Found: C, 69.5; H, 7.2; N, 3.0% $C_{27}H_{33}NO_6$ requires C, 69.4; H, 7.1; N, 3.0%.)

The amide in dry tetrahydrofuran (80 ml.) was added to a stirred suspension of lithium aluminium hydride (1.25 g.) in dry tetrahydrofuran (50 ml.) and the mixture was stirred under reflux for 3 hours. The product was worked up by the method of Example 21 and, following recrystallization from light petroleum, cyclohexane and aqueous ethanol, the product was obtained as prisms (1.3 g.) M.P. 107° C. (Found: C, 73.4; H, 8.5; N, 3.4% $C_{25}H_{33}NO_4$ requires C, 73.0; H, 8.1; N, 3.4%.)

EXAMPLE 23

N-cyclopropylmethyl-6,14-endoethano-7-(2-hydroxy-2-butyl)tetrahydronororipavine

N-cyclopropylmethyl-6,14-endoethano - 7 - (2-hydroxy-2-butyl) tetrahydronorthebaine (7.9 g.) was added to a stirred solution of potassium hydroxide (23.7 g.) in diethylene glycol (96 ml.) at 210–220° C. under nitrogen. The mixture was stirred at this temperature for 2 hours and then poured into ice-water (500 ml.). The solution was saturated with ammonium chloride and the precipitated phenolic base was collected, washed well with water and recrystallized from methanol (4.0 g.) A sample recrystallized from methanol had M.P. 195° C. Found: C, 73.8; H, 8.4; N, 3.2% $C_{27}H_{28}NO_4$ requires C, 73.8; H, 8.4; N, 3.2%.)

EXAMPLE 24

6,14-endoethano-7-(2-hydroxy-2-pentyl)-tetrahydronororipavine

N-cyano - 6,14 - endoethano - 7 - (2-hydroxy-2-pentyl) tetra-hydronorthebaine (16 g.) was added to potassium hydroxide (50 g.) in diethylene glycol (180 ml.) at 180–190° C. and the mixture was stirred at 210–220° C. for 45 mins. and then poured into ice-water. Saturated ammonium chloride was added and the precipitated phenolic base was collected and washed well with water. The crude material was dissolved in dilute acetic acid, and treated with charcoal and the base was precipitated with ammonia. The solid was crystallized from aqueous Cellosolve to give the crude product (7.2 g.). A sample was purified by further dissolving in dilute acetic acid, treating with charcoal, making alkaline and recrystallization. It had M.P. 236–239° C. (Found: C, 73.1; H, 7.9; N, 3.6% $C_{24}H_{33}NO_4$ requires C, 72.1; H, 8.3; N, 3.5%.)

EXAMPLE 25

N-cyclopropylmethyl-6,14-endoethano-7-(2-hydroxy-2-pentyl)tetrahydronororipavine Cyclopropyl carbonyl chloride (8.8 g.) was added to 6,14-endoethano - 7 - (2-hydroxy - 2 - pentyl)tetrahydronororipavine (4.2 g.) in tetrahydrofuran (150 ml.) and triethylamine (16 ml.). After standing overnight the mixture was evaporated, treated with dilute hydrochloric acid and extracted with ether (3×100 ml.) The ethereal extracts after washing with water (3×100 ml. were dried and evaporated. The resulting gum was dissolved in dry tetrahydrofuran (60 ml.) and reduced with lithium aluminium hydride (7.5 g.) in tetrahydrofuran (200 ml.). The cooled stirred mixture was cautiously decomposed by the addition of a cold saturated solution of sodium potassium tartrate. The aqueous layer was extracted with ether and the ethereal extracts were combined with the original organic layer, washed with water, dried and evaporated. The crude product was crystallized from methanol. The product was dissolved in 2 N sodium hydroxide, the solution washed with ether and then treated with saturated ammonium chloride solution. The mixture was extracted with ether and the extracts were evaporated. The residual oil was crystallized from aqueous methanol and further purified by precipitation with ammonium chloride solution in a mixture of ethanol and 2 N sodium hydroxide solution, M.P. 177–179° C. (Found: C, 74.1; H, 8.5; N, 3.3% $C_{28}H_{39}NO_4$ requires C, 43.1; H, 8.7; N, 3.1%.)

The following tables set out further examples of novel compounds prepared in accordance with the invention:

| Example Number | R | R¹ | R² | R³ | Method of Example | Halide Used | Yield, Percent of Theory | M.P., ° C. |
|---|---|---|---|---|---|---|---|---|
| 26 | Me | Me | Me | CH₂CH=CH₂ | 9 | Br | 57 | 126 |
| 27 | Me | Me | Me | 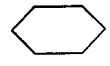 | 12 | Cl | 42 | 195 |
| 28 | Me | Me | Me | CH₂Ph | 12 | Cl | 58 | 146 |
| 29 | Me | Me | Me | Ph | 12 | Br | 47 | 201-2 |
| 30 | Me | CN | Me | Et | 17 | | 81 | 168-170 |
| 31 | Me | CN | Me | n-Pr | 17 | | 79 | 198-9 |
| 32 | Me | CN | Me | i-Pr | 17 | | 75 | 221-2 |
| 33 | Me | CN | Me | n-Bu | 17 | | 83 | 152-3 |
| 34 | Me | CN | Me | sec-Bu | 17 | | 70 | 188-9 |
| 35 | Me | CN | Me | i-Bu | 17 | | 83 | 179-180 |
| 36 | Me | CN | Me | t-Bu | 17 | | 85 | 206-7 |
| 37 | Me | CN | Me | n-Am | 17 | | 87 | 141-2 |
| 38 | Me | CN | Me | i-Am | 17 | | 88 | 152 |
| 39 | Me | CN | Me | 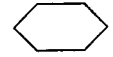 | 17 | | 70 | 215-6 |

| Example Number | R | R¹ | R² | R³ | Method of Example | Halide Used | Yield, Percent of Theory | M.P., °C. |
|---|---|---|---|---|---|---|---|---|
| 40 | Me | H | Me | Me | 18 | ---------- | 68 | 145-6 |
| 41 | Me | H | Me | Et | 18 | ---------- | 58 | 142-3 |
| 42 | Me | H | Me | n-Pr | 18 | ---------- | 72 | *260-267 |
| 43 | Me | H | Me | n-Bu | 18 | ---------- | 16 | 136 |
| 44 | Me | H | Me | i-Bu | 18 | ---------- | 90 | 126-8 |
| 45 | Me | H | Me | t-Bu | 18 | ---------- | 88 | 169 |
| 46 | Me | H | Me | n-Am | 18 | ---------- | 57 | 240-1 |
| 47 | Me | CH₂CH=CH₂ | Me | Me | 20 (a) | Br | 81 | *101-2 |
| 48 | Me | CH₂CH=CMe₂ | Me | Me | 20 (a) | Br | 54 | 110-1 |
| 49 | Me | CH₂C≡CH | Me | Me | 20 (a) | Br | 76 | 126-7 |
| 50 | Me | CH₂–△ | Me | Me | 21 | ---------- | 72 | 122-3 |
| 51 | Me | CH₂–△ | Me | n-Pr | 21 | ---------- | 37 | 98-9 |
| 52 | Me | CH₂–△ | Me | n-Bu | 21 | ---------- | 58 | 101-2 |
| 53 | Me | CH₂–△ | Me | t-Bu | 21 | ---------- | 57 | 109 |
| 54 | Me | CH₂–△ | Me | n-Am | 21 | ---------- | 23 | 78 |
| 55 | Me | CH₂–△ | Me | ⬡ | 21 | ---------- | 62 | 126 |
| 56 | H | CH₂–△ | Me | Me | 23 | ---------- | 24 | 180-5 |
| 57 | H | CH₂–△ | Me | n-Bu | 23 | ---------- | 66 | 178 |
| 58 | H | CH₂–△ | Me | t-Bu | 23 | ---------- | 68 | 209 |

Satisfactory analytical data were obtained for all the compounds of Examples 26 to 58.

In the above table ⬡ represents cyclohexyl.

*Hydrochloride.

Chemical names of Examples 26–58

(26) 6,14-endoethano - 7 - (4 - hydroxy - 4 - pentenyl)-tetrahydrothebaine.
(27) 6,14 - endoethano - 7 - (1 - hydroxy - 1 - cyclohexyl-1-ethyl)-tetrahydrothebaine.
(28) 6,14 - endoethano - 7 - (2 - hydroxy - 1 - phenyl-2-propyl)-tetrahydrothebaine.
(29) 6,14 - endoethano - 7 - (1 - hydroxy - 1 - phenyl-1-ethyl)-tetrahydrothebaine.
(30) N - cyano - 6,14 - endoethano - 7 - (2 - hydroxy-2-butyl)-tetrahydronorthebaine.
(31) N - cyano - 6,14 - endoethano - 7 - (2 - hydroxy-2-pentyl)-tetrahydronorthebaine.
(32) N - cyano - 6,14 - endoethano - 7 - (2 - hydroxy-3-methyl-2-butyl)-tetrahydronorthebaine.
(33) N - cyano - 6,14 - endoethano - 7 - (2 - hydroxy-2-hexyl)-tetrahydronorthebaine.
(34) N - cyano - 6,14 - endoethano - 7 - (2 - hydroxy-3-methyl-2-pentyl)-tetrahydronorthebaine.
(35) N - cyano - 6,14 - endoethano - 7 - (2 - hydroxy-4-methyl-2-pentyl)-tetrahydronorthebaine.
(36) N - cyano - 6,14 - endoethano - 7 - (2 - hydroxy-3,3-dimethyl-2-butyl)-tetrahydronorthebaine.
(37) N - cyano - 6,14 - endoethano - 7 - (2 - hydroxy-2-heptyl)-tetrahydronorthebaine.
(38) N - cyano - 6,14 - endoethano - 7 - (2 - hydroxy-5-methyl-2-hexyl)-tetrahydronorthebaine.
(39) N - cyano - 6,14 - endoethano - 7 - (1 - hydroxy-1-cyclohexyl-1-ethyl)-tetrahydronorthebaine.
(40) 6,14 - endoethano - 7 - (2 - hydroxy - 2 - propyl)-tetrahydronorthebaine.
(41) 6,14 - endoethano - 7 - (2 - hydroxy - 2 - butyl)-tetrahydronorthebaine.
(42) 6,14 - endoethano - 7 - (2 - hydroxy - 2 - pentyl)-tetrahydronorthebaine.
(43) 6,14 - endoethano - 7 - (2 - hydroxy - 2 - hexyl)-tetrahydronorthebaine.
(44) 6,14 - endoethano - 7 - (2 - hydroxy - 4 - methyl-2-pentyl)-tetrahydronorthebaine.
(45) 6,14 - endoethano - 7 - (2 - hydroxy - 3,3 - dimethyl-2-butyl)-tetrahydronorthebaine.
(46) 6,14 - endoethano - 7 - (2 - hydroxy - 2 - heptyl)-tetrahydronorthebaine.
(47) N - allyl - 6,14 - endoethano - 7 - (2 - hydroxy - 2-propyl)-tetrahydronorthebaine.
(48) N - 3,3 - dimethylallyl - 6,14 - endoethano - 7 - (2-hydroxy-2-propyl)-tetrahydronorthebaine.
(49) N - propargyl - 6,14 - endoethano - 7 - (2 - hydroxy-2-propyl)-tetrahydronorthebaine.
(50) N - cyclopropylmethyl - 6,14 - endoethano - 7 - (2-hydroxy-2-propyl)-tetrahydronorthebaine.
(51) N - cyclopropylmethyl - 6,14 - endoethano - 7 - (2-hydroxy-2-pentyl)-tetrahydronorthebaine.
(52) N - cyclopropylmethyl - 6,14 - endoethano - 7 - (2-hydroxy-2-hexyl)-tetrahydronorthebaine.
(53) N - cyclopropylmethyl - 6,14 - endoethano - 7 - (2-hydroxy-3,3-dimethyl-2-butyl)-tetrahydronorthebaine.
(54) N - cyclopropylmethyl - 6,14 - endoethano - 7 - (2-hydroxy-2-heptyl)-tetrahydronorthebaine.
(55) N - cyclopropylmethyl - 6,14 - endoethano - 7 - (1-hydroxy-1-cyclohexyl-1-ethyl)-tetrahydronorthebaine.
(56) N - cyclopropylmethyl - 6,14 - endoethano - 7 - (2-hydroxy-2-propyl)-tetrahydronororipavine.
(57) N - cyclopropylmethyl - 6,14 - endoethano - 7 - (2-hydroxy-2-hexyl)-tetrahydronororipavine.
(58) N - cyclopropylmethyl - 6,14 - endoethano - 7 - (2-hydroxy-3,3-dimethyl-2-butyl)-tetrahydronororipavine.

The thebain and oripavine derivatives of the present invention are useful as analgesics through their power to affect the central nervous system. Compounds of the present invention also exhibit sedative and anti-tussive effects.

When R is hydrogen or methyl, $R^1$ is n-propyl, allyl, methylallyl, dimethylallyl, propargyl, or cyclopropyl methyl, $R^2$ is hydrogen, methyl, ethyl or propyl and $R^3$ is alkyl of up to 2 carbon atoms, the compounds of the presen invention exhibit in addition to their analgesic properties, narcotic antagonist properties and in particular exhibit the ability to antagonize the effects of morphine.

All of the compounds of the present invention exhibit analgesic activity when tested by one or more of the known analgesic test procedures.

The test procedures used to indicate analgesia in animals were the rat-tail pressure method of H. F. Green and P. A. Young (1951) Br. J. Pharmac. Chemother., 6, 572, the rat antibradykinin method of G. F. Blane (1967) J. Pharm. Pharmacol 19, 367 and the intraperitoneal phenyl-p-benzoquinone in the mouse method of L. C. Hendershot and J. Forsaith (1959) P. Pharmac. exp. Ther 125, 237.

Compounds useful against high intensities of pain were found to be active in the tail pressure test using the following technique. Male rats weighing 60–80 g. received either saline as controls or one of a logarithmic series of doses of the drug, either subcutaneously or orally 30 and 60 min. respectively before determining pain thresholds. The animals were regarded as showing analgesia if they failed to squeal on application of a pressure greater than twice the mean pressure required to cause a vocal response in the controls. From the percentage showing analgesia at each dose level the $ED_{50}$ was calculated. Codeine and morphine are found to be active as analgesics in this test.

Compounds effective against moderate and low intensities of pain were found to be active in the rat antibradykinin test or the mouse intraperitoneal phenyl-p-benzoquinone test. The rat antibradykinin test was carried out by first determining the minimum dose of bradykinin required consistently to produce dextrorotation of the head and flexion of the right fore-limb for each rat. This dose was commonly 0.05 or 0.10 µg. and rats not responding to 0.50 µg. were discarded. Rats did not always squeak after these threshold doses of bradykinin and disappearance of the head rotation and fore-limb flexion were taken as the criteria for scoring an analgesic effect in animals after drug administration. Bradykinin was given as a solution of the pure synthetic peptide in 0.2 ml. of 0.9% saline and was washed in immediately with a further 0.2 ml. of saline. The response developed within about 5 seconds and persisted for about a further 10 seconds. Compounds under test were administered by oral, subcutaneous or intraperitoneal route, after which the established threshold dose of bradykinin was injected at regular intervals until the dose response returned. For any given drug and dose level the percentage of rats failing to respond to the algesic stimulus was plotted against time. With all drugs the $ED_{50}$ values at the time of peak effect were estimated. The Hendershot and Forsaith test was carried out by injecting female mice with the drug under test or saline for control purposes at various times before an intraperitoneal injection of phenyl-p-benzoquinone. The dose of the drug required to reduce by 50% the number of abdomineal stretches caused by the irritant action of the phenyl-p-benzoquinone was calculated by comparison with the controls.

It has surprisingly been found that the compounds of the present invention show a marked increase in analgesic activity as compared to the corresponding etheno derivatives, i.e. the compounds of formula:

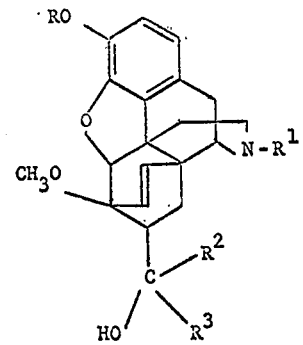

which compounds have a steric configuration according to compound II:

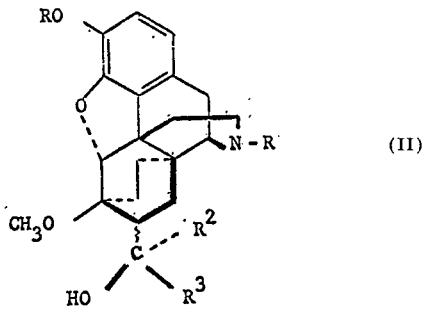

(II)

which compounds are described in our copending U.S. application Ser. No. 478,738 and my continuations-in-part thereof.

The following results illustrate this surprising increase in analgesic activity, the analgesic activity of the compounds being assessed by the rat tail pressure method described above:

TABLE II

| R | $R^1$ | $R^2$ | $R^3$ | Etheno Analgesia $ED_{50}$ (mg./kg.) | Ethano Analgesia $ED_{50}$ (mg./kg.) | Increase in Activity $\dfrac{\text{Etheno } ED_{50}}{\text{Ethano } ED_{50}}$ |
|---|---|---|---|---|---|---|
| H  | CH₂—▷ | Me | n-Pr | 0.0054 | 0.0017  | 3.2   |
| H  | Me    | Me | n-Pr | 0.0009 | 0.00017 | 5.3   |
| Me | H     | Me | i-Pr | 3.80   | 0.80    | 4.7   |
| Me | Me    | Me | Et   | 4.60   | 0.350   | 13.1  |
| Me | Me    | Me | n-Pr | 0.120  | 0.026   | 4.6   |
| Me | Me    | Me | i-Pr | 0.270  | 0.095   | 2.8   |
| Me | Me    | Me | n-Bu | 0.240  | 0.007   | 34.3  |
| Me | Me    | Me | t-Bu | 27.0   | 0.120   | 225.0 |
| Me | CH₂—▷ | Me | i-Pr | 17.0   | 5.0     | 3.4   |

When mixed with suitable excipients or diluents, the compounds of this invention can be prepared as pills, capsules, tablets, powders, solutions, suspensions and the like for unit dosage, to simplify administration. As analgesics they will relieve pain by an action on the nerve centres within the central nervous system. As anti-trussives they depress the cough centre. As antagonists, they occupy the same sites in the brain as morpheine-like drugs thus blocking access of the latter agents to their site of action.

Morphine antogonizing ability was studied using the method of A. F. Green, G. K. Ruffell and E. Walton (1054), J. Pharm. Pharmacol., 6, 390. This test was similar to that described for the tail pressure test except that all rats were additionally injected with a dose of morphine causing analgesia in 100% of the animals. The dose of antagonist was determined which reduced the effect of the morphine to that which caused analgesia in 50% of the animals.

It was also surprisingly found that the compounds of the present invention which exhibited morphine antagonist properties showed a surprising increase in activity compared to the corresponding etheno compounds of Formula VII. For instance the endothano compound in which R=H, R'=cyclopropylmethyl, $R^2=R^3=$Me is approximately 16 times more active than the corresponding endoetheno derivative. Similarly the endoethano compound in which R=H, $R^1=$cyclopropylmethyl, $R^2=$H, $R^3=$Me is approximately 8 times more active than the corresponding endoetheno compound.

The following are some of the most interesting compounds of the invention.

(R=H, $R^1=CH_2$—<, $R^2=R^3=$Me; dihydro cyprenorphine) resembles cyprenorphine by being a competitive antagonist of morphine-like agents. As mentioned above it is approximately 16 times more active than cyprenorphine. In contrast to nalorphine and cyprenorphine it antagonises pentazocine and may therefore be more use than the former drugs for combating the effects of large doses of antagonist-analgesics of the pentazocine type.

(R=Me, $R^1=CH_2$—<, $R^2=R^3=$Me) is a weak morphine antagonist also possessing morphine-like agonist properties. For this reason its pharmacological properties may be considered to be analogous to those of pentazocine. Parenterally in animals its potency as an analgesic is of the same order as pentazocine and doses for humans would be in the range of from about 10 to 50 mg.

What is claimed is:

1. A compound selected from the group consisting of a compound of the formula:

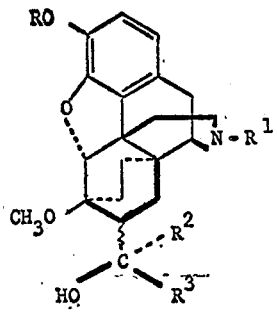

and its non-toxic pharmaceutically-acceptable salts, wherein:

R is hydrogen or methyl, $R^1$ is hydrogen, alkyl, alkenyl or alkynyl of up to 8 carbon atoms or cycloalkyl methyl of 4-6 carbon atoms, $R^2$ is hydrogen, alkyl or alkenyl of up to 3 carbon atoms, phenyl or tolyl, and $R^3$ is cycloalkyl of 5-7 carbon atoms, alkyl or alkenyl of up to 8 carbon atoms or alkyl or alkenyl of up to 8 carbon atoms substituted on one of the carbon atoms numbered 1-4 (the carbon atom numbered 1 being adjacent to the carbon atom bearing the alcoholic hydroxy group) by cycloalkyl of 5-7 carbon atoms, phenyl, tolyl, alkoxy of 1-3 carbon atoms, phenoxy or tetrahydrofuryl, provided that in the case where R is hydrogen, $R^2$ and $R^3$ do not contain the system

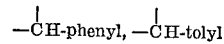

or

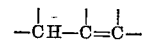

attached directly to the carbon atom bearing the alcoholic hydroxy group.

2. 6,14-endoethano-7-(2-hydroxy-2-propyl)-tetrahydrothebaine.

3. 6,14-endoethano-7-(2-hydroxy-2-butyl)tetrahydrothebaine.

4. 6,14-endoethano-7-(2-hydroxy-2-pentyl)tetrahydrothebaine.

5. 6,14-endoethano-7-(2-hydroxy-4-methyl-2-pentyl)tetrahydrothebaine.

6. N-cyclopropylmethyl-6,14-endoethano-7-(2-hydroxy-2-propyl)tetrahydronorthebaine.

7. N-cyclopropylmethyl-6,14-endoethano-7-(2-hydroxy-2-propyl)tetrahydronororipavine.

8. N-cyclopropylmethyl-6,14-endoethano-7-hydroxymethyl tetrahydronorthebaine.

References Cited

UNITED STATES PATENTS 3,285,914  11/1966  Gordon  260—285

ALEX MAZEL, Primary Examiner.

D. G. DAUS, Assistant Examiner.

U.S. Cl. X.R.

260—192, 544, 593, 999